US007978247B2

(12) United States Patent
Nakajima et al.

(10) Patent No.: US 7,978,247 B2
(45) Date of Patent: Jul. 12, 2011

(54) FOCUSING INFORMATION VISUALIZATION DEVICE, AND CORRESPONDING METHOD, PROGRAM AND RECORDING MEDIUM

(75) Inventors: Ayahiro Nakajima, Matsumoto (JP); Naoki Kuwata, Shiojiri (JP); Kenji Matsuzaka, Shiojiri (JP); Seiji Aiso, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 751 days.

(21) Appl. No.: 11/891,977

(22) Filed: Aug. 13, 2007

(65) Prior Publication Data

US 2008/0036900 A1 Feb. 14, 2008

(30) Foreign Application Priority Data

Aug. 14, 2006 (JP) ................................ 2006-221110
Jul. 6, 2007 (JP) ................................ 2007-178811

(51) Int. Cl.
*H04N 5/222* (2006.01)
*H04N 5/232* (2006.01)

(52) U.S. Cl. ................................ 348/333.04; 348/346

(58) Field of Classification Search ............. 348/333.01, 348/333.02, 333.04, 333.11, 345, 346
See application file for complete search history.

(56) References Cited

U.S. PATENT DOCUMENTS 5,496,106 A * 3/1996 Anderson ..................... 348/255
2003/0002870 A1* 1/2003 Baron ........................... 396/147
2003/0117511 A1* 6/2003 Belz et al. ................ 348/333.11
2005/0243351 A1 11/2005 Aoyama

FOREIGN PATENT DOCUMENTS

JP 2003-262909 9/2003
JP 2005-309559 11/2005
JP 2005-333587 12/2005
JP 2006-072660 3/2006

OTHER PUBLICATIONS

Abstract of Japanese Patent Publication No. 2005-309559, Pub. Date: Nov. 4, 2005, Patent Abstracts of Japan.
Abstract of Japanese Patent Publication No. 2006-072660, Pub. Date: Mar. 16, 2006, Patent Abstracts of Japan.

* cited by examiner

*Primary Examiner* — Timothy J Henn
(74) *Attorney, Agent, or Firm* — Martine Penilla & Gencarella, LLP

(57) ABSTRACT

The focusing information visualization system of the invention extracts an edge having an edge intensity of not less than a first reference value Th1 and an edge width of not greater than a second reference value Th2 in a photographic image and displays the extracted edge in a preset color at a position of the edge extraction to be overlapped with the original photographic image on a screen. A focused area defined by the extracted edge is displayed as N divisional areas. In response to a user's operational specification of one divisional area among the N divisional areas, an enlarged photographic image corresponding to the specified divisional area at a desired magnification ratio is displayed on the screen. This arrangement adopts the automatic rough judgment and the user's final visual check to accurately recognize the focusing status of the photographic image.

17 Claims, 8 Drawing Sheets

FOCUSING INFORMATION VISUALIZATION DEVICE, AND CORRESPONDING METHOD, PROGRAM AND RECORDING MEDIUM

CLAIM OF PRIORITY

The present application claims the priority from Japanese applications P2006-221110A filed on Aug. 14, 2006 and P2007-178811A filed on Jul. 6, 2007, the contents of which are hereby incorporated by reference into this application.

BACKGROUND

1. Field of the Invention

The present invention relates to a technique of visualizing focusing information of photographic images as display on a screen.

2. Related Art

Digital still cameras equipped with liquid crystal displays and camera-equipped cell phones have been widely spread and used as imaging devices. In these imaging devices, the user can check the focusing status, for example, the blur or the out-of-focus, of each taken image on the liquid crystal display. Various techniques have been proposed to enable accurate recognition of the focusing status.

For example, an image processing device disclosed in Japanese Patent Laid-Open Gazette No. 2005-309559 sums up the number of edges included in each specified area of an image and extracts and displays an image section corresponding to an area having a greatest number of edges as a check image. Another image processing device disclosed in Japanese Patent Laid-Open Gazette No. 2006-72660 processes image data by Fourier transform and performs a deterioration enhancement process for the image having a high frequency component of or below a preset rate.

These prior art image processing devices give certain levels of information for focus judgment but are not capable of accurately detecting the position of focus. A system for accurate recognition of a focusing status of an image including the position of focus is thus highly demanded.

SUMMARY

At least part of the above and the other related demands is attained by a focusing information visualization device, a corresponding focusing information visualization method, and a corresponding focusing information visualization program having the configurations discussed below.

According to one aspect, the invention is directed to a focusing information visualization device that visually displays focusing information of a photographic image on a screen.

The focusing information visualization device includes: an edge extraction module that extracts an edge satisfying a preset focusing condition among edges present in the photographic image, based on luminance information of respective pixels constituting the photographic image; and a focusing information output module that outputs focusing information based on the extracted edge in a visually recognizable manner on the screen.

The focusing information visualization device of the invention refers to the preset focusing condition and extracts an edge judged as focused from a photographic image. The focusing information based on the extracted edge is output in a visually recognizable manner on the screen. This arrangement enables the user to readily check the focusing status of the photographic image on the screen. The output focusing information is effectively used for the focus judgment of the photographic image.

The technique of the present invention may be actualized by diversity of applications, for example, the focusing information visualization device mounted on various equipment including digital still cameras, camera-equipped cell phones, printers, photo viewers, and computers, as well as a corresponding focusing information visualization method, a corresponding focusing information visualization program, and a computer readable recording medium for recording the focusing information visualization program. The scope and spirit of the present invention are indicated by the appended claims.

DESCRIPTION OF THE PREFERRED EMBODIMENTS

Some modes of carrying out the invention are described below as preferred embodiments with reference to the accompanied drawings.

(1) First Embodiment

Figure 1:
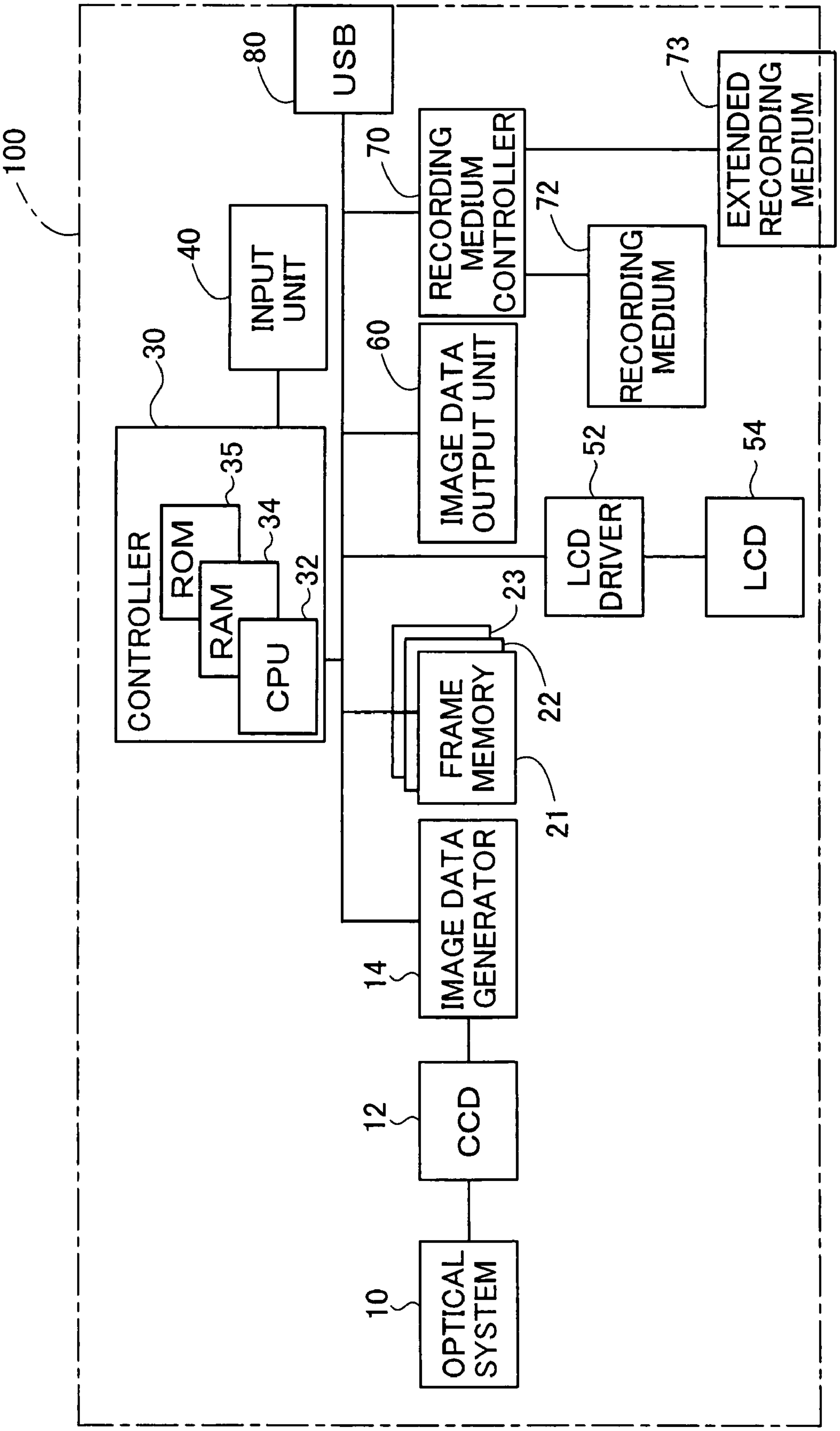
FIG. 1 schematically illustrates the basic structure of a digital still camera in a first embodiment of the invention.

FIG. 1 schematically illustrates the basic structure of a digital still camera 100 in a first embodiment of the invention. As shown in FIG. 1, the digital still camera 100 includes an optical system 10, a CCD 12, an image data generator 14, a frame memories 21, 22, and 23, a controller 30, an input unit 40, an LCD driver 52, an LCD 54, an image data output unit 60, a recording medium controller 70, a recording medium 72, an extended recording medium 73, and a USB interface 80.

The optical system 10 has a lens and a diaphragm mechanism to form an optical image as an imaging object on the CCD 12. The CCD 12 converts the optical image formed by the optical system 10 into an electrical signal. The image data generator 14 processes the electrical signal input from the CCD 12 and outputs the processed signal as multivalued (R, G, B) raster data (image data) to the frame memory 21.

The frame memory 21 is generally used as a memory for display of images on the LCD 54. The input image data is expanded in the form of a bitmap image on the frame memory 21. The frame memory 22 is used as a memory for display of menus according to the requirements. The frame memory 23 is used as a memory for display of focusing information (described later). The storage contents of the frame memories 21, 22, and 23 may be displayed on the LCD 54 in an overlapping manner according to the requirements.

The controller 30 including a CPU 32, a RAM 34, and a ROM 35 controls the operations of the image data generator 14, the frame memories 21 to 23, the image data output unit 60, and the recording medium controller 70 and extracts edges satisfying a preset focusing condition as described later.

The input unit 40 has various buttons and switches. The input unit 40 receives a user's command through operation of these buttons and switches, converts the input instruction into a digital signal, and sends the digital signal to the controller 30.

The LCD driver 52 drives and controls the liquid crystal and displays the data stored in the frame memories 21 to 23 on the LCD 54. The LCD 54 is a liquid crystal display of 320×240 dots.

In response to the user's image record command through a press of a specified button on the input unit 40, the image data output unit 60 converts the R, G, and B raster data on the frame memory 21 into YCbCr data having luminance components and color difference components, and performs JPEG compression of image data and reduction of image data for generation of a thumbnail image.

The recording medium controller 70 is a control circuit for storage of image data in the recording medium 72 and the extended recording medium 73. The recording medium controller 70 controls recording operations to write the JPEG-compressed image data (hereafter referred to as JPEG image data) and the reduced image data received as outputs from the image data output unit 60 at predetermined positions in the recording medium 72 or the extended recording medium 73 and to read out the recorded JPEG image data from the recording medium 72 or the extended recording medium 73.

The USB interface 80 works as an interface to external devices (not shown). For example, the USB interface 80 is activated to send the image data stored in the recording medium 72 or the extended recording medium 73 to a personal computer or another computer device, to make communication via a modem, and to generate print image data and directly send the generated print image data to a printer for storage and printing.

Figure 2:
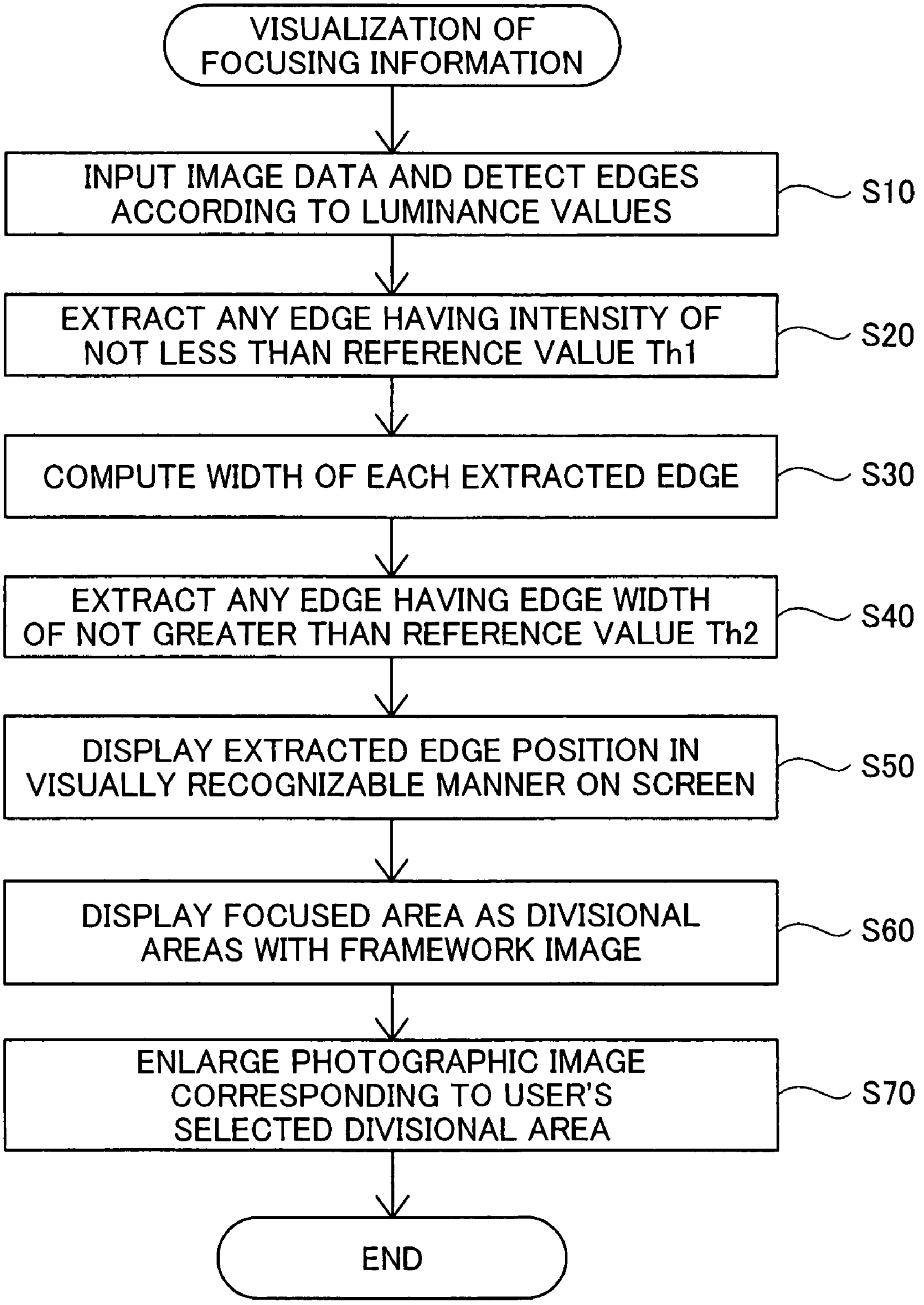
FIG. 2 is a flowchart showing a focusing information visualization process of displaying focusing information on an LCD of the digital still camera in the first embodiment of the invention.

The following description regards a process of extracting edges satisfying a preset focusing condition and displaying focusing information. FIG. 2 is a flowchart showing a focusing information visualization process. According to this focusing information visualization process of FIG. 2, the controller 30 extracts edges satisfying a preset focusing condition from photographic image data, which is taken with the digital still camera 100 and is stored in the recording medium 72, and outputs the obtained focusing information of the photographic image to the LCD 54 for screen display.

The controller 30 first inputs object photographic image data and detects edges according to the luminance values of respective pixels p(x,y) in the input photographic image data (step S10). According to a concrete procedure, the user operates the input unit 40 to select a desired thumbnail among thumbnails that are displayed on the LCD 54 and correspond to photographic image data stored in the recording medium 72 or the extended recording medium 73. In response to the user's selection of the desired thumbnail, the controller 30 obtains and stores YCbCr data of the corresponding photographic image as an object of visualization of focusing information into the RAM 34. The controller 30 then processes the luminance values Y of the YCbCr data with a Sobel filter to detect edges. The procedure of this embodiment uses the YCbCr data for edge detection. This is, however, not restrictive in any sense. Corresponding to the type of a medium with application of the technique of the invention, Lab data or YIQ data may be used for detection of edges based on the luminance values Y.

Figure 3:
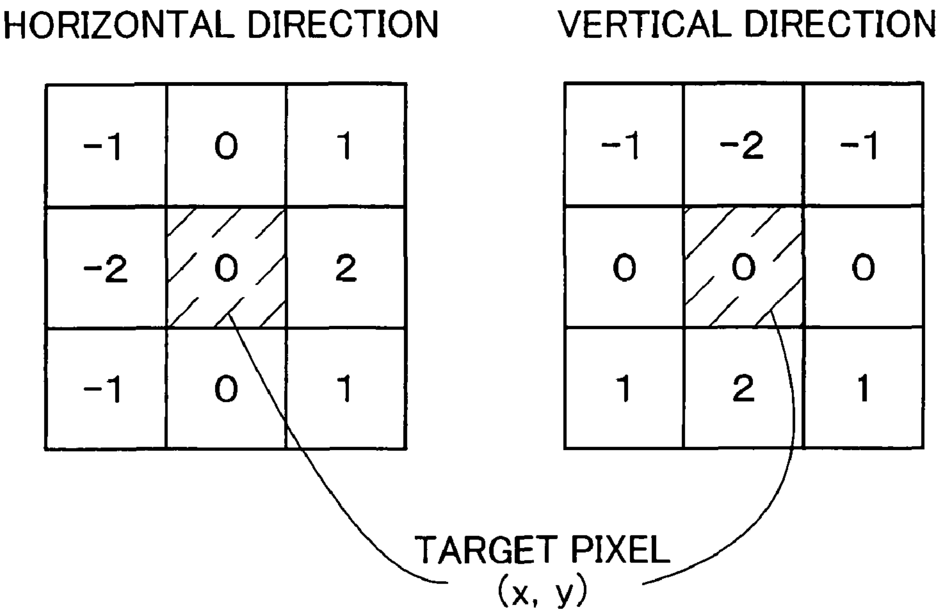
FIG. 3 shows the principle of a Sobel filter.
Figure 4:
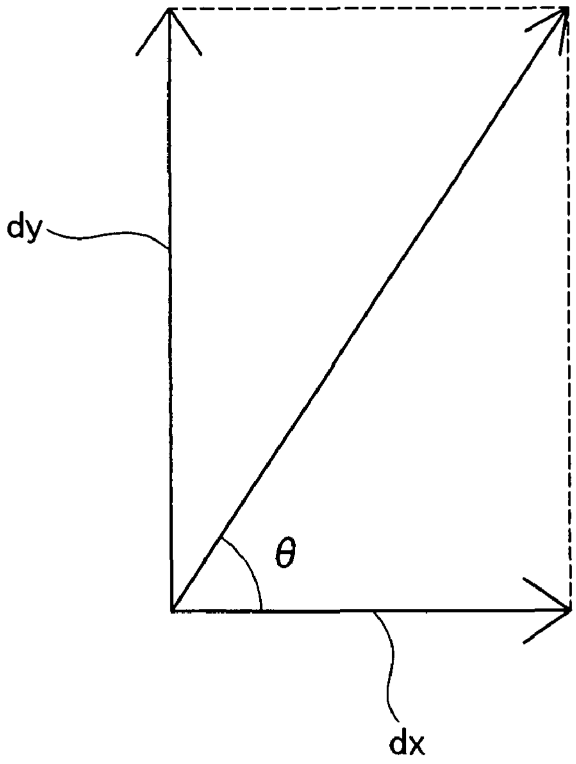
FIG. 4 shows an edge direction θ relative to edge gradients dx and dy.

The processing with the Sobel filter is described with reference to FIG. 3. The Sobel filter multiplies nine luminance values by factors set at the corresponding positions in factor matrixes in both a horizontal direction and a vertical direction and sums up the results of the multiplication. The nine luminance values include one luminance value at a target pixel position (x,y) and eight luminance values at surrounding pixel positions on the upper left, the upper right, immediately above, on the left, on the right, on the lower left, on the lower right, and immediately below the target pixel position (x,y). The multiplication results in the horizontal direction and in the vertical direction are respectively expressed as edge gradients dx and dy at the target pixel position (x,y) in the horizontal direction and in the vertical direction. As shown in FIG. 4, an edge at the target pixel position (x,y) has a direction or an angle θ satisfying a relation of tan θ=dy/dx and an intensity a(x,y) expressed by Equation (1) given below:

$$a(x,y)=\sqrt{dx^2+dy^2} \quad (1)$$

The Sobel filter adopted for edge detection in this embodiment may be replaced by any of other diverse filters for edge detection, for example, a Prewitt filter or a Roberts filter.

Referring back to the flowchart of FIG. 2, the controller 30 extracts any edge having the intensity a(x,y) of not less than a first reference value Th1 among the edges of the intensities a(x,y) detected at step S10 (step S20). The first reference value Th1 is a preset threshold value and may be selected among several levels for controlling the number of extracted edges. The first reference value Th1 may be set according to the type of an object image, for example, a portrait image or a landscape image.

The controller 30 subsequently computes the width of each edge extracted at step S20 as the edge having the intensity a(x,y) of not less than the first reference value Th1 (step S30). According to a concrete procedure, the edge having the angle θ in a range of 0°≦θ<45° is regarded as an edge in the horizontal direction (in the direction dx), whereas the edge having the angle θ in a range of 45°≦θ≦90° is regarded as an edge in the vertical direction (in the direction dy). The edge width is then computed in these two directions, that is, in the horizontal direction and in the vertical direction.

Figure 5A:
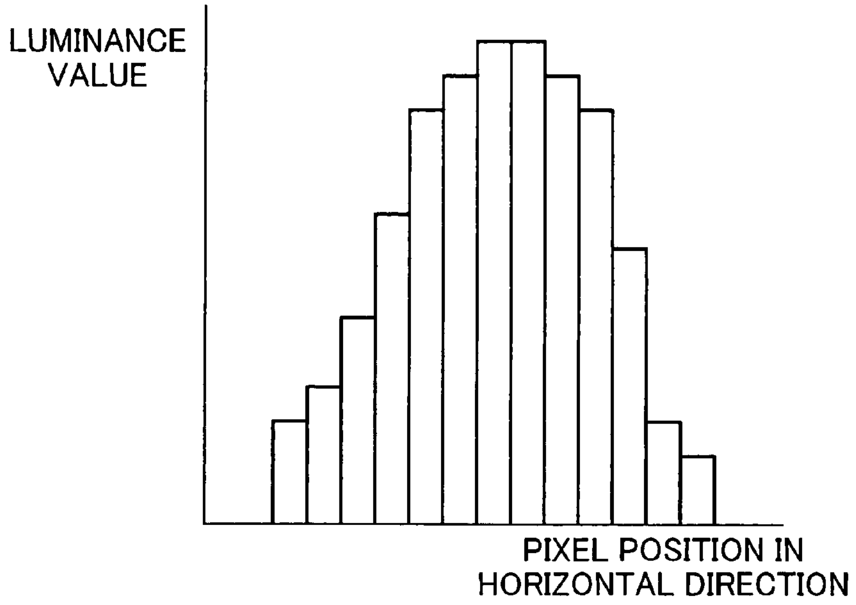
FIG. 5A through 5C show computation of an edge width in the first embodiment.
Figure 5B:
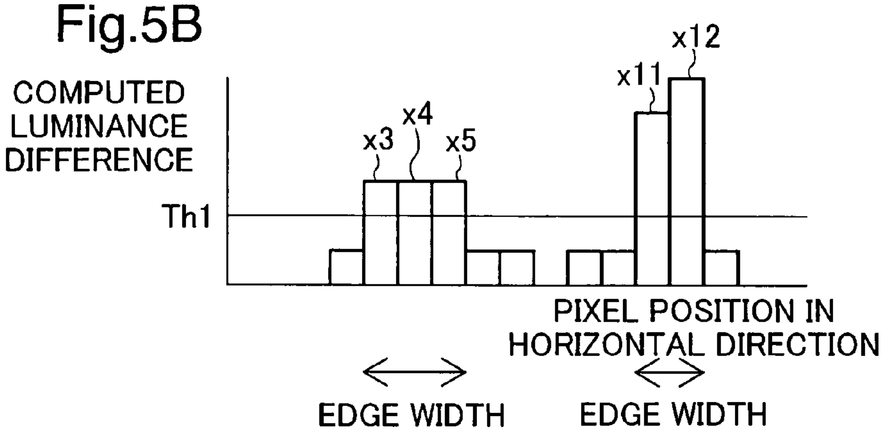
Figure 5C:
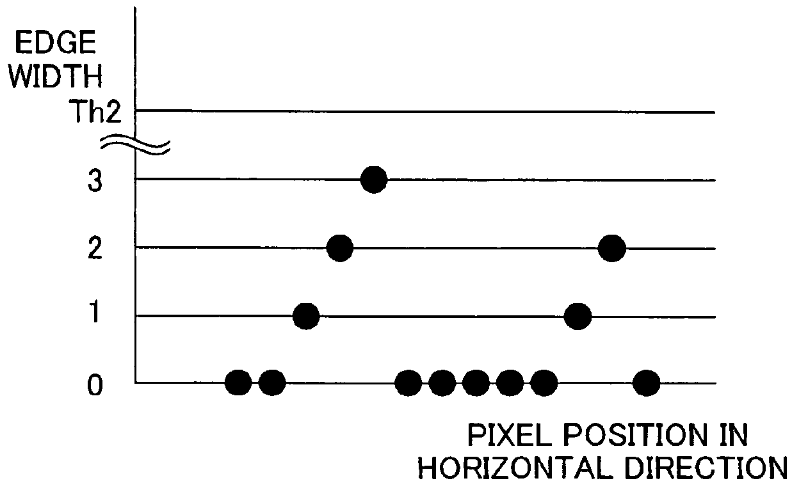

Computation of the edge width is described with reference to FIG. 5. FIG. 5A is a graph showing a variation in luminance value against the pixel position of a photographic image in the horizontal direction (in the direction dx). The edge detection at step S10 computes luminance differences between adjacent pixels (edge intensities a(x,y)) as shown in FIG. 5B. Pixels x3 to x5 and pixels x11 and x12 having the computed luminance differences or edge intensities a(x,y) of or over the first reference value Th1 are extracted at step S20. The number of continuity of the extracted pixels x3 to x5 and that of the extracted pixels x11 and x12 in the horizontal direction are computed as the respective edge widths in the horizontal direction at step S30. In this illustrated example, the computed edge width of the extracted pixels x3 to x5 in the horizontal direction and the computed edge width of the extracted pixels x11 and x12 in the horizontal direction are respectively equal to '3' and '2' as shown in FIG. 5C. The edge widths in the vertical direction (in the direction dy) are computed in a similar manner, which is not specifically illustrated.

In this embodiment, the user eventually judges the focusing or non-focusing of an image. The focusing information is thus obtained with preference to the computation speed over the accuracy of information. The procedure of this embodiment computes the edge width by quantizing an arbitrary direction to the horizontal direction and the vertical direction. Another available procedure specifies edge gradients dx and dy in the horizontal direction 'x' and in the vertical direction 'y' and computes an edge angle θ and an edge width ΔL as:

$$\tan \theta = dy/dx; \text{ and}$$

$$\Delta L = \sqrt{dx^2 + dy^2}$$

This procedure performs the focusing judgment based on the edge having the edge direction or edge angle θ and the edge width ΔL. The edge width represents the length of continuity of an edge (dx,dy) having an arbitrary angle θ in the direction of a preset angle θ1. The procedure of the embodiment detects an edge of adjacent pixels having different angles θ2 and θ3 (where $0° \leqq \theta 2 < \theta 3 < 45°$) as an edge of adjacent pixels aligned in the horizontal direction. Upon requirement for display of the focusing information with the higher accuracy, the edge width should be computed after computation of the edge direction θ or should be computed in each of a greater number of different directions. The first reference value Th1 may be varied according to the range of the edge direction θ.

Referring back to the flowchart of FIG. 2, the controller 30 extracts any edge having the edge width that is computed at step S30 and is of not greater than a second reference value Th2, among the edges extracted at step S20 as the edge having the edge intensity a(x,y) of not less than the first reference value Th1 (step S40). In this embodiment, the edge width is computed in both the horizontal direction and the vertical direction at step S30 as mentioned previously. The processing of step S40 accordingly compares the edge widths both in the horizontal direction and in the vertical direction with the second reference value Th2 and extracts any edge having the edge width of not greater than the second reference value Th2. In the illustrated example of FIG. 5C, the edge of the pixels x3 to x5 in the horizontal direction has the edge width of '3', and the edge of the pixels x11 and x12 in the horizontal direction has the edge width of '2'. Both these edges have the edge widths satisfying the condition of not greater than the second reference value Th2. Namely the edge of the pixels x3 to x5 and the edge of the pixels x11 and x12 are extracted at step S40. The second reference value Th2 may be varied according to the detection direction of the edge width.

The second reference value Th2 may be fixed or may be varied according to the recorded image size or the trimmed image size by the trimming function of the digital still camera 100. For example, in selection of L-size printing as the initial setting, as the experience shows, the second reference value Th2 is set to the number of pixels corresponding to 0.5 mm on the size L. The second reference value Th2 for an identical image size may be varied according to the print paper size. For example, in the case of printing an image of a predetermined image size in a print paper size A4, in response to the user's selection of a size option A4 in a print paper size menu through operation of the input unit 40, the second reference value Th2 is automatically changed from the initial setting, that is, the number of pixels corresponding to 0.5 mm on the size L, to the number of pixels corresponding to 0.3 mm on the size A4. The second reference value Th2 may be varied according to the combination of the image size and the print paper size.

The position of each edge extracted at step S40 is displayed in a predetermined recognizable form as information representing a focused area on the screen (step S50). The edge extracted at step S40 has the edge width of not greater than the preset value Th2 and is thus a relatively sharp edge. An object image formed by pixels having this edge is regarded as 'focused'. The processing of step S50 accordingly outputs the position of the extracted edge as a focused area. In the structure of this embodiment, the output display mode of the edge position is selectable by the user's operation of the input unit 40 between two options, that is, a first display mode of showing only edge position image data output to the frame memory 23 (see FIG. 1) and displayed in a specific color on the LCD 54 (FIG. 1) and a second display mode of showing edge position image data output to the frame memory 23 in an overlapping manner with photographic image data output to the frame memory 21 (FIG. 1) on the LCD 54. The display color of the edge position image data is selectable among multiple color options to be clearly recognizable even when being overlapped with photographic image data of any color.

The controller 30 subsequently displays an area including the extracted edge satisfying the focusing condition, that is, a focused area including an object image having the contour formed by the edge extracted at step S40, as divisional areas parted by a frame image on the LCD 54 (step S60). The divisional display of a focused area is described with reference to FIG. 6. In the illustrated example of FIG. 6A, edge position image data is displayed in an overlapping manner with photographic image data on the LCD 54 by the second display mode at step S50. The hatched area shows an object image OB, and the doted line represents an edge position display FP. In the illustrated example, the processing of step S60 displays a frame image FR of divisional areas F1 to F7 shown in FIG. 6B in an overlapping manner with the object image OB in the focused area of the edge position display FP shown in FIG. 6A. In the structure of this embodiment, a whole photographic image is dividable into quarters both along the length and along the width to have 16 divisional areas at the maximum. The divisional display shows the frame image only in divisional areas included in the focused area. The number of divisional areas is, however, not restricted to this value but may be set arbitrarily according to the number of pixels on the LCD 54 or the number of pixels in the photographic image. The number of and the positions of the divisional areas may be set automatically according to the size of the focused area and the number of pixels on the LCD 54. The whole photographic image may be subjected to the divisional display in a preset number of divisional areas according to the number of pixels on the LCD 54.

Figure 6A:
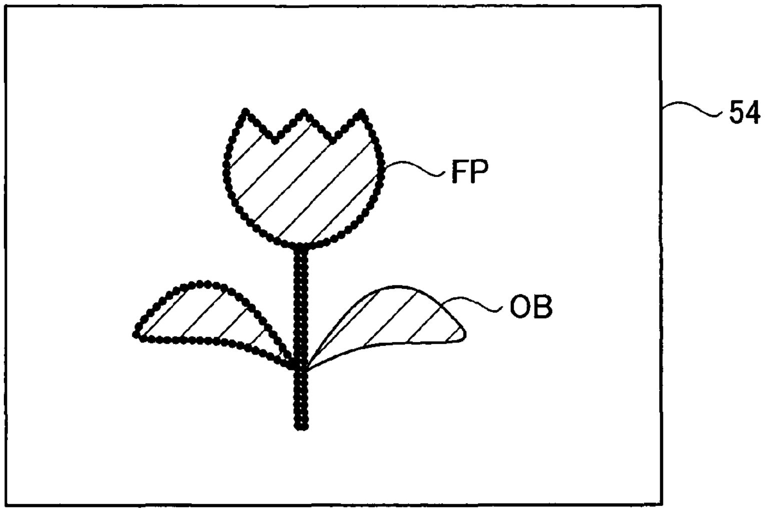
FIG. 6A through 6C show divisional display and enlarged display of a focused area.
Figure 6B:
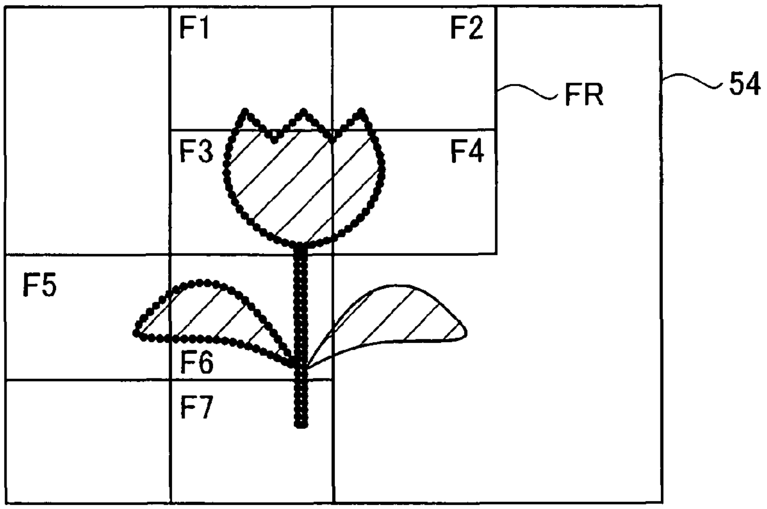
Figure 6C:
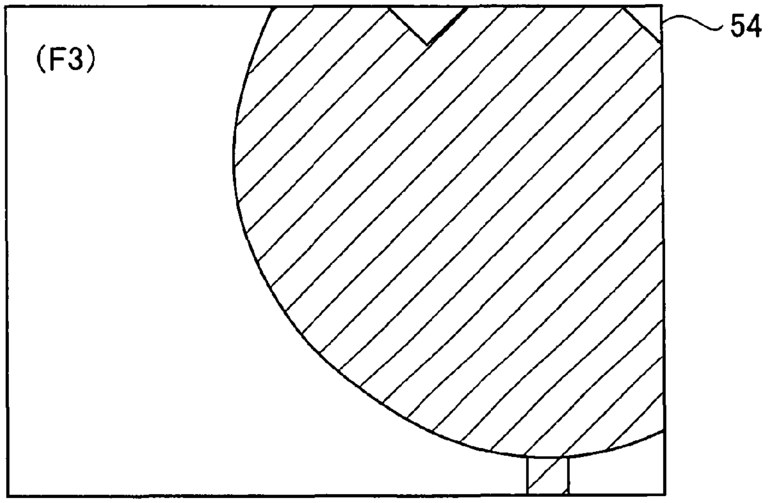

In response to the user's selection of one divisional area among the divisional areas displayed at step S60, a photographic image corresponding to the selected divisional area is enlarged at a desired magnification ratio (step S70). In the illustrated example, the divisional areas F1 to F7 are displayed at step S60. When the user operates cursor move keys on the input unit 40 to select a divisional area F3, a photographic image corresponding to the selected divisional area F3 is enlarged over the whole screen of the LCD 54 as shown in FIG. 6C. The magnification ratio of enlargement may be selected among preset options, for example, 100%, 75%, 50%, and 25% (the magnification ratio of 100% represents pixel size magnification) and changed to a desired magnification ratio by the user's operation of the cursor move keys on the input unit 40. When the enlarged photographic image corresponding to the selected divisional area F3 is displayed at the preset magnification ratio on the LCD 54 but is greater in size than the size of the LCD 54, the user operates the cursor move keys to shift the display position on the LCD 54.

The digital still camera 100 of the first embodiment gives rough display of a focused area in a photographic image in a visually recognizable manner based on the results of extraction and computation and enables the user to enlarge the focused area at a desired magnification ratio on the LCD 54 and visually check the focusing state of the photographic image.

(2) Second Embodiment

Figure 7:
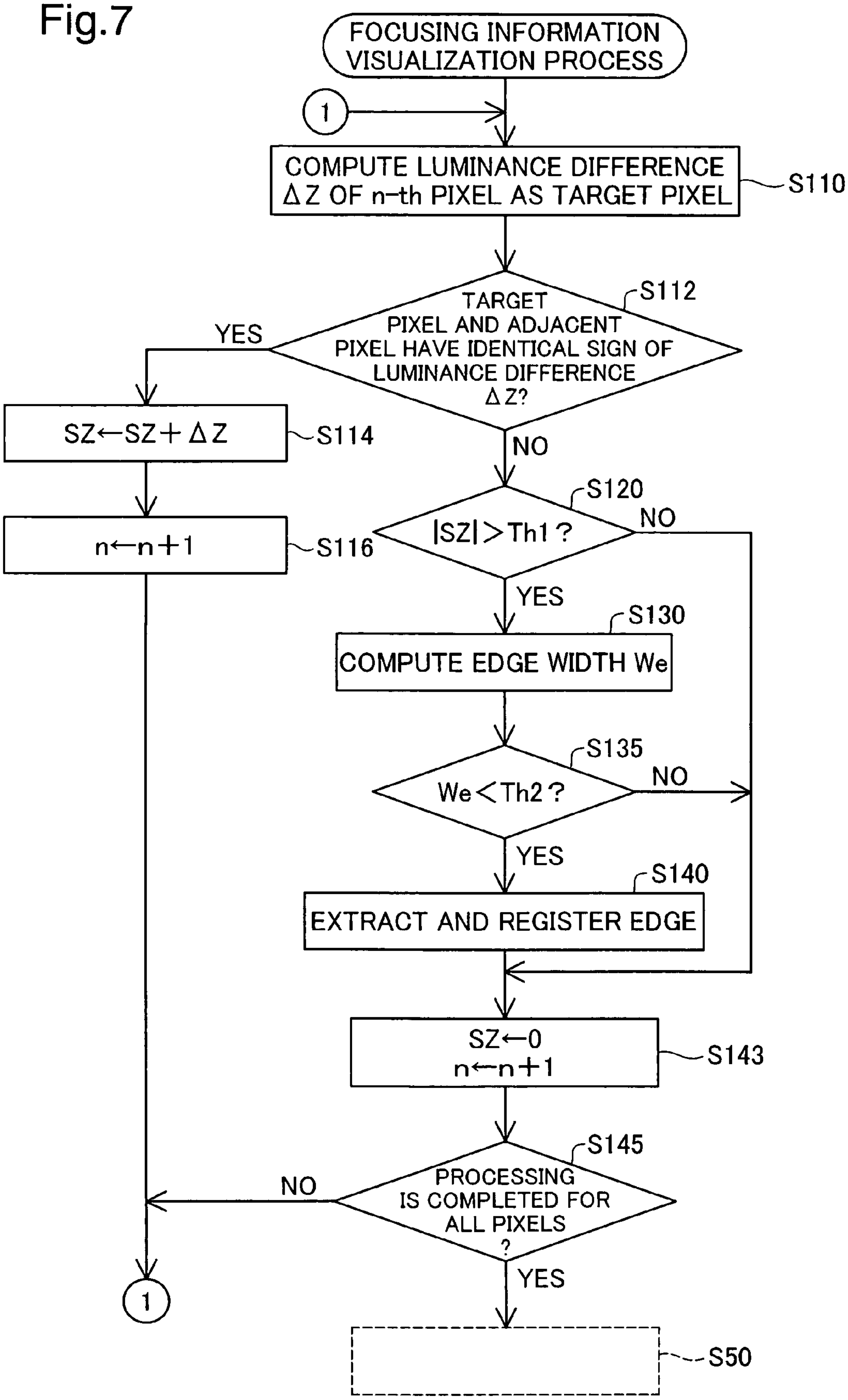
FIG. 7 is a flowchart showing a characteristic part of a focusing information visualization process performed in a second embodiment of the invention.
Figure 8A:
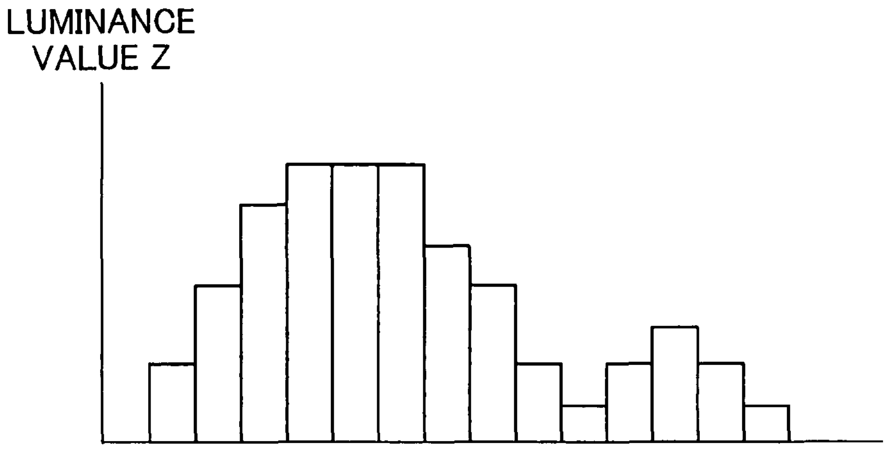
FIGS. 8A and 8B show extraction of an edge according to luminance differences between adjacent pixels in the second embodiment.
Figure 8B:
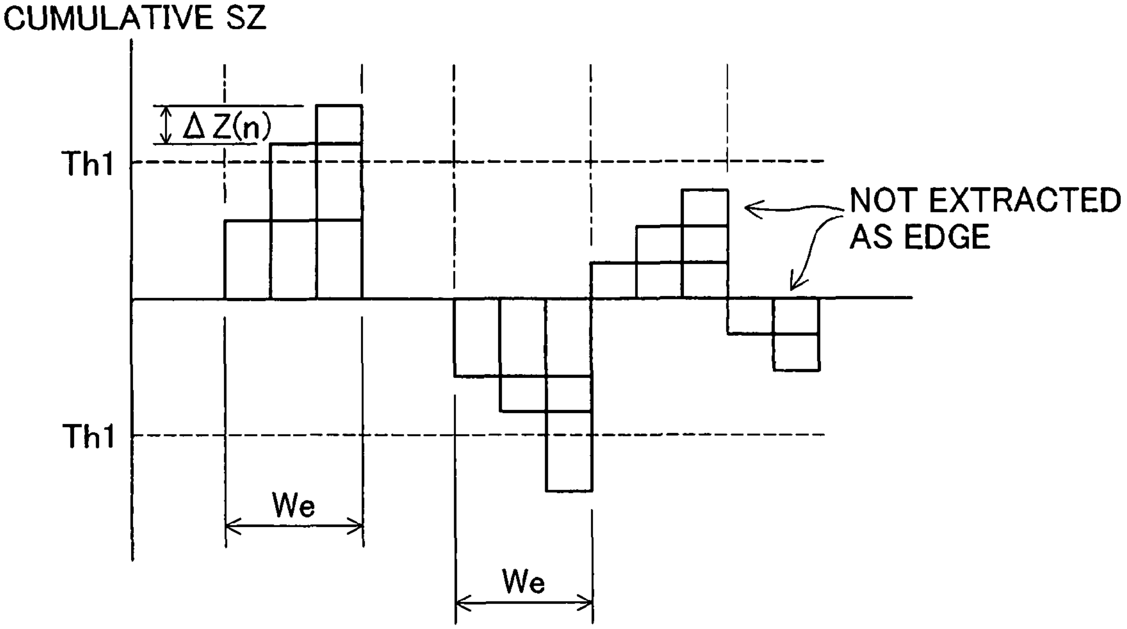

A digital still camera in a second embodiment of the invention described below has the same hardware configuration as that of the digital still camera 100 in the first embodiment of the invention. The difference from the first embodiment is only part of the focusing information visualization process for extraction of edges. The focusing information visualization process of the second embodiment executes the processing of steps S110 to S145 shown in the flowchart of FIG. 7, in place of the processing of steps S10 to S40 of the first embodiment shown in the flowchart of FIG. 2. In the focusing information visualization process of the second embodiment, the controller 30 first computes a luminance difference ΔZ between an n-th pixel and an adjacent pixel aligned in a predetermined direction (step S110). In the second embodiment, the luminance difference is computed in both the horizontal direction and the vertical direction. FIG. 8 shows computation of the luminance differences ΔZ in the horizontal direction. FIG. 8A shows a variation in luminance value Z against the pixel position in the horizontal direction. FIG. 8B shows accumulation of luminance differences ΔZ between adjacent pixels. While the procedure of the first embodiment obtains the amounts of luminance change as absolute values, the procedure of the second embodiment computes the luminance differences ΔZ as values with the + and − signs. The luminance differences ΔZ are sequentially computed between adjacent pixels. In the description below, a luminance difference with regard to a current target pixel and a luminance difference with regard to a previous pixel immediately before the current target pixel are expressed as ΔZ (n) and ΔZ(n−1), respectively.

The controller 30 determines whether the sign of the computed luminance difference ΔZ (n) of the current target pixel matches with the sign of the computed luminance difference ΔZ (n−1) of the previous pixel (step S112). In the case of matching (step S112: yes), the controller 30 detects continuation of an edge and computes a cumulative SZ of the luminance difference ΔZ(n) (step S114). According to the concrete procedure, the luminance difference ΔZ (n) of the current target pixel is added to the cumulative SZ (SZ←SZ+ΔZ(n)). The cumulative SZ is reset to 0 on detection of start of an edge. After computation of the cumulative SZ, the position of the target pixel is shifted by 1 in the predetermined direction (n←n+1) (step S116). The focusing information visualization process then goes back to step S110 to repeat the above series of processing.

In the course of repetition of the above processing, it is determined that the sign of the computed luminance difference ΔZ (n) of the current target pixel does not match with the sign of the computed luminance difference ΔZ (n−1) of the previous pixel (step S112: no). The controller 30 then determines whether the absolute value |SZ| of the cumulative SZ is greater than a preset first reference value Th1 (step S120). The comparison with the preset first reference value Th1 is shown in FIG. 8B. When the absolute value |SZ| of the cumulative SZ is greater than the first reference value Th1 (step S120: yes), there may be an edge as a target of judgment for the focusing state. The controller 30 subsequently computes an edge width We (step S130). The edge width We is given as the number of pixels having the same sign of the luminance differences ΔZ computed at step S110.

It is then determined whether the computed edge width We is less than a preset second reference value Th2 (step S135). When the edge width We is less than the second reference value Th2 (step S135: yes), the controller 30 identifies the continuation of pixels as an edge in the focused state and extracts the edge for registration (step S140). The controller 30 then resets the cumulative SZ to 0 and shifts the position of the target pixel by 1 in the predetermined direction (n←n+1) (step S143). When the absolute value |SZ| of the cumulative SZ is not greater than the first reference value Th1 (step S120: no) or when the edge width We is not less than the second reference value Th2 (step S135: no), the controller 30 identifies no edge in the focused state and goes to step S143 to reset the cumulative SZ to 0 and shift the position of the target pixel by 1 in the predetermined direction (n←n+1). The presence of an edge in the focused state is detected according to the magnitude of the cumulative SZ of the luminance difference ΔZ, in response to a change of the sign of the luminance difference ΔZ between adjacent pixels, as clearly shown in FIG. 8. The cumulative SZ is reset to 0 for detection of a next edge, regardless of detection or non-detection of an edge in the focused state in the current cycle of the processing flow.

After the judgment for detection of one edge by the above series of processing, it is determined whether the processing has been completed for all the pixels in a photographic image (step S145). When there is any unprocessed pixel (step S145: no), the focusing information visualization process goes back to step S110 and repeats the processing of steps S110 to S143. On completion of the processing with regard to all the pixels (step S145: yes), on the other hand, the focusing information visualization process shifts to the processing of and after step S50 in the flowchart of FIG. 2 described in the first embodiment. The subsequent processing in the focusing information visualization process of the second embodiment is identical with that of the first embodiment and is not described in detail here. The focusing information visualization process of the second embodiment outputs each edge extracted and registered at step S140 and displays an area including the edge as a focused area with the photographic image in a visually recognizable manner.

As described above, the digital still camera of the second embodiment extracts an edge based on the magnitude of the cumulative SZ of the luminance difference ΔZ when the adjacent pixels have different signs of the luminance difference ΔZ. Even when there is any specific pixel having the small luminance difference ΔZ in the middle of an alignment of pixels constituting an edge, the focusing information visualization process of the second embodiment does not detect pixels before and after this specific pixel as separate edges. In the overall tendency of a gradual increase or a gradual decrease in luminance of pixels, the presence of separate edges is detected in response to the luminance difference ΔZ equal to 0 or a change of the sign of the luminance difference ΔZ. This arrangement desirably lowers the potential for wrong detection of an edge area. The focusing information visualization process of the second embodiment thus enables accurate detection of the presence of each edge as the focusing information.

(3) Third Embodiment

Figure 9:
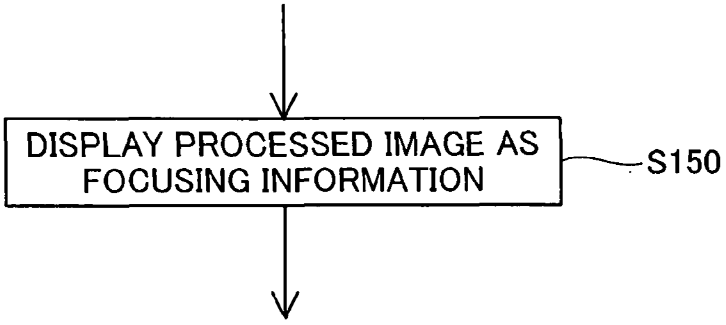
FIG. 9 is a flowchart showing a characteristic part of a focusing information visualization process performed in a third embodiment of the invention.

A digital still camera in a third embodiment of the invention described below has the same hardware configuration as those in the first and the second embodiments of the invention. The difference from the first embodiment is only part of the focusing information visualization process for display of the extracted edge. The focusing information visualization process of the first embodiment displays the position of an extracted edge as a focused area in a visually recognizable manner on the LCD 54 at step S50 in the flowchart of FIG. 2. In the first embodiment, the edge position display FP is laid over the object image OB at the position of the edge extraction as shown in FIG. 6A. The focusing information visualization process of the third embodiment, on the other hand, extracts an edge as a focused area from the whole image and displays a processed image corresponding to the position of the edge extraction at step S150 in the flowchart of FIG. 9.

Figure 10:
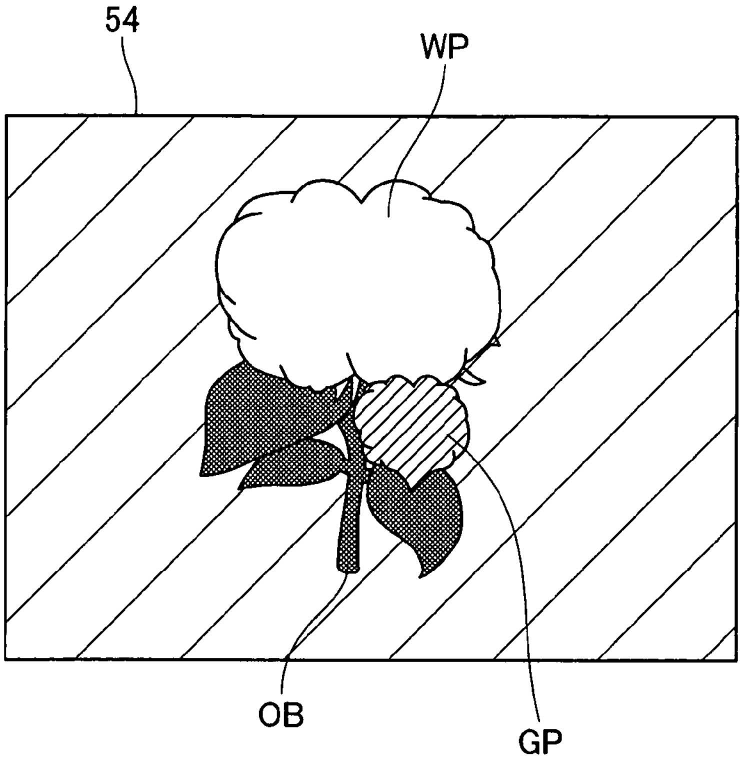
FIG. 10 shows display of a processed image in a focused area by image processing.

The display of a processed image by the process of the third embodiment is shown in FIG. 10 as one example. The image corresponding to the position of the edge extraction is pained in white and displayed as a white-filled image on the LCD 54. In the illustrated example of FIG. 10, the area of a flower is focused and is displayed as a white-filled area WP. This method does not give display of an original image but advantageously allows the user to readily identify a focused area. One extended application of this method evaluates the focusing degree of each focused area by multiple stages and displays a completely focused area as the white-filled area WP and a slightly blurred but still focused area as a gray-filled area GP. In the illustrated example of FIG. 10, the area of a front leaf is evaluated as secondary focused and is displayed as a gray-filled area GP. The colors for painting such focused areas are not restrictive but may be set to any desired colors. Corresponding letter strings, for example, 'focused area' and 'secondary focused area' may be additionally displayed in the respective areas WP and GP.

The image corresponding to the extracted edge as the focused area is displayed as the white-filled image WP in the illustrated example but may be processed by any of other diverse series of image processing as given below:

(A) The photographic image corresponding to the position of the edge extraction and identified as focused (hereafter referred to as 'focused area') is displayed in color, whereas the photographic image corresponding to the position other than the edge extraction position and not identified as focused (hereafter referred to as 'non-focused area') is displayed in black and white (or is not displayed);

(B) The photographic image in the focused area and the photographic image in the non-focused area are displayed in complementary colors;

(C) Only the photographic image in the focused area is displayed at a different lightness;

(D) Only the photographic image in the focused area is displayed in negative-positive inversion or in luminance inversion;

(E) Only the photographic image in the focused area is blinking;

(F) Any of the above series of image processing are combined;

(G) These series of image processing for the focused area and for the non-focused area are reversed; and (H) The processed image by any of the above series of image processing (A) to (F) and an original image are displayed alternately at preset time intervals. One preferable design allows the user to select a desired display method among these options by the operation of the input unit 40. The photographic image enlarged by the user's selection of an object divisional area at step S70 in the flowchart of FIG. 2 may be a processed photographic image after image processing or an original photographic image before image processing. Selection between the processed photographic image and the original photographic image for enlarged display may be allowed by the user's operation of the input unit 40.

The focusing information visualization process of the third embodiment highlights the focused area or the non-focused area in the above manner and enables the user to readily identify the focused area in the photographic image of any color.

(4) Modification 1

The focusing information visualization process of the first embodiment extracts each edge having the edge width of not greater than the second reference value Th2 at step S40 and displays the position of the extracted edge as visually recognizable focusing information at step S50. One possible modification may output the position of each extracted edge in a specific display form corresponding to the edge width as visually recognizable focusing information.

The modified procedure uses intermediate reference values Th2(1) and Th2(2) satisfying a relation of $1<\text{Th}2(1)<\text{Th}2(2)<\text{Th}2$ to further classify the edges extracted at step S40 according to the edge width for color coding at step S50. For example, with regard to the extracted edge having the edge width 'w' in a range of $1\leqq w<\text{Th}2(1)$, the extracted edge position is displayed in red. With regard to the extracted edge having the edge width 'w' in a range of $\text{Th}2(1)\leqq w<\text{Th}2(2)$, the extracted edge position is displayed in yellow. With regard to the extracted edge having the edge width 'w' in a range of $\text{Th}2(2)\leqq w\leqq \text{Th}2$, the extracted edge position is displayed in blue. Instead of such color coding, the classified edges according to the edge width may be displayed in the same color tint with varying lightness or may be expressed by color gradation.

The edge having the smaller edge width is regarded as the sharper edge having the higher degree of focusing.

This modified procedure displays the degree of focusing as well as the position of focusing as the focusing status of a photographic image. This arrangement facilitates the user's selection of a target area for enlargement on the LCD 54 and enhances the efficiency of checking the focusing status of the photographic image.

(5) Modification 2

The focusing information visualization process of the first embodiment extracts any edge having the edge intensity a(x, y) of not less than the first reference value Th1 at step S20 and computes the edge widths both in the horizontal direction and in the vertical direction specified according to the edge angle θ at step S30. The edge extraction at step S20 and the edge width computation at step S30 may be modified as discussed below.

The modified procedure extracts any edge having an edge intensity ax(x,y) in the horizontal direction (in the direction dx) of not less than a first reference value Th1$x$ in the horizontal direction (that is, $ax(x,y)=|dx|\geqq \text{Th}1x$) and any edge having an edge intensity ay(x,y) in the vertical direction (in the direction dy) of not less than a first threshold value Th1$y$ in the vertical direction (that is, $ay(x,y)=|dy|\geqq \text{Th}1y$) at step S20. The modified procedure then computes the edge widths both in the horizontal direction and in the vertical direction with regard to each edge extracted at step S20.

This arrangement simplifies the arithmetic operation and enables computation of the edge widths both in the horizontal direction and in the vertical direction within a short time period. The description of this modification regards computation of the edge widths in the horizontal direction and in the vertical direction as in the first embodiment, but the edge width may be detected and computed in any arbitrary direction.

(6) Modification 3

Figure 11:
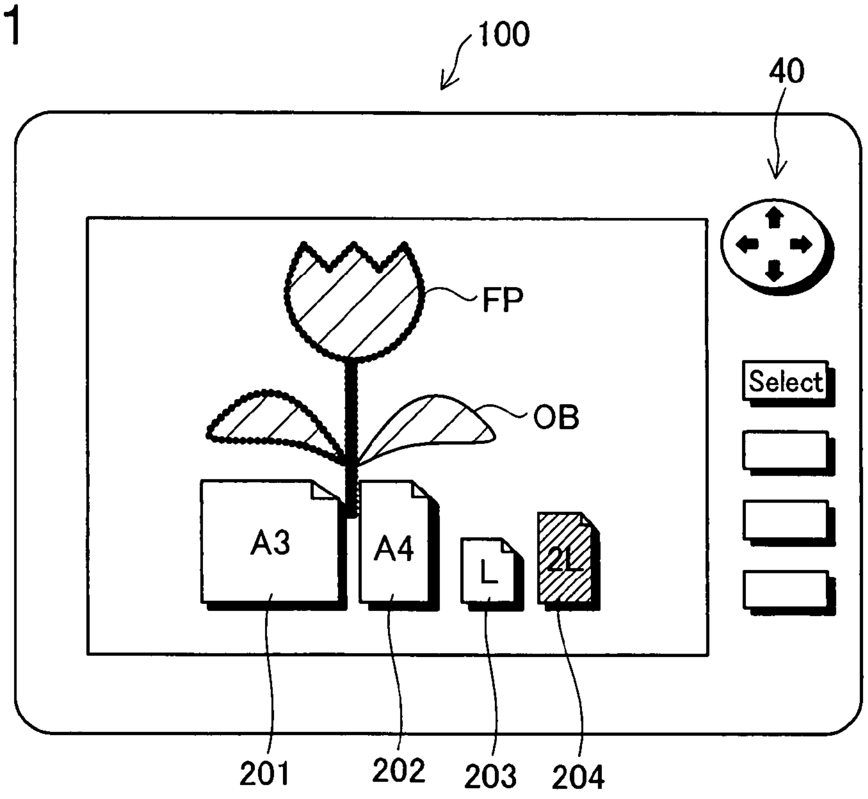
FIG. 11 shows display on the LCD in Modification 3.

In the focusing information visualization process of the first embodiment, the second reference value Th2 used for edge extraction is varied according to the setting of the print paper size. The print paper size is set and changed by selection of the corresponding size option, for example, size option A4, among the options in the print paper size menu. In one modified structure shown in FIG. 11, the print paper size may be set by selection of an icon among multiple icons. In the illustrated example of FIG. 11, in response to the user's operation of the input unit 40 to call a setting mode of the print paper size for determining the second reference value Th2, selectable paper size options are displayed as icons 201 to 204 on the window. Symbols representing the selectable paper size options 'A3', 'A4', '2L', and 'L' are additionally displayed in the respective icons 201 to 204. Here 'L' denotes the L-size printing generally used for photograph printing.

In the illustrated example, the icons 201 to 204 displayed in the window are successively selected by the user's operation of cursor keys on the input unit 40. The selection of the icon is settled by the user's press of a 'Select' key. In one extended application, a touch panel may be provided on the LCD 54. The user uses a finger or a stylus pen to directly touch and point an icon of a desired print paper size among multiple icons displayed on the touch panel. The touched icon of the desired paper size is highlighted in display to clearly inform the user of the selection. In the illustrated example of FIG. 11, the icon 204 is selected and is highlighted in display.

Selection of a different icon changes the print paper size and varies the second reference value Th2 used for edge extraction. In response to selection of each icon, the preferable procedure may newly set the second reference value Th2 for edge extraction corresponding to the print paper size of the selected icon and change the display of a printing image on the LCD 54. In the structure of the first embodiment, the edge position display FP as focusing information is painted in a preset color to clearly show the focusing area. In response to selection of each icon, the changed color display of a printing image with the selected icon effectively informs the user of a clear and sharp printing area and a relatively blurred printing area in the selected print paper size. This arrangement enables the user to readily check the focusing information by simple selection of an icon among multiple icons displayed on the LCD 54. In the illustrated example of FIG. 11, icons of different sizes are used corresponding to the relation of the actual print paper sizes. This is, however, not essential at all. These icons may have an identical size. The display of these icons is cancelled out by the user's operation of the input unit 40 to terminate the setting mode of the print paper size.

The above description regarding several embodiments and modifications is only illustrative and not restrictive in any sense. The principle of the present invention is actualized by diversity of other applications. Some embodiments of possible applications are given below.

In one preferable embodiment of the focusing information visualization device of the invention, the edge extraction module has: an edge detector that detects an edge at each position of the photographic image according to the luminance information of the respective pixels constituting the photographic image; a first edge extractor that extracts an edge having an intensity of not less than a preset first reference value among the detected edges; an edge width calculator that computes an edge width of each extracted edge; and a second edge extractor that extracts any edge having the computed edge width of not greater than a preset second reference value.

The focusing information visualization device having the edge extraction module of this arrangement extracts the edge having the edge intensity and the edge width satisfying predetermined conditions and enables accurate judgment of the focusing status of the photographic image.

According to one aspect of the focusing information visualization device of this embodiment, the edge detector detects a gradual luminance difference variation area as an edge among the respective pixels constituting the photographic image, where the gradual luminance difference variation area has either a gradual increase or a gradual decrease in cumulative luminance difference between adjacent pixels aligned in a predetermined direction. The first edge extractor extracts an edge when an absolute value of the gradually increasing or decreasing cumulative luminance difference exceeds a predetermined threshold value. The edge width calculator computes the width of the extracted edge over a whole range of the gradual increase or the gradual decrease. This arrangement ensures accurate detection of the edge width.

According to another aspect of the focusing information visualization device of this embodiment, the edge detector detects an edge at each position of the photographic image, based on a luminance difference between adjacent pixels aligned in a predetermined direction among the respective pixels constituting the photographic image. The use of the luminance difference between the adjacent pixels desirably simplifies the processing and enables the high-speed detection of edges over the whole range.

In another preferable embodiment of the focusing information visualization device of the invention, the focusing information output module processes an original image at a position of the extracted edge on the screen to output the original image in a differentiating display form as the focusing information.

The focusing information visualization device of this embodiment changes the display form of the original image to output the focusing information. The user can thus readily recognize the focusing information by simply checking the state of the image display.

The focusing information output module performs a predetermined series of image processing on the original image to change the display form of the original image. At least either of pixels having an edge judged as focused and pixels without such an edge in the photographic image are thus subjected to the predetermined series of image processing and displayed in the differentiating display form. The user is thus readily informed of the position of focus judgment in the photographic image of any color. The predetermined series of image processing is performed on the photographic image to facilitate the user's visual recognition of the position of focus judgment and allows, for example, black and white display, no display, complementary color display, light-varying display, negative-positive inversion display, or blinking display.

In the focusing information visualization device of this embodiment, the focusing information outputs module may output the original image at the position of the extracted edge in the differentiating display form selected among multiple display forms of:

changing the original image to a gray image having a lightless of or over a predetermined level;

alternately displaying the original image and the gray image;

changing the original image to an image of negative-positive inversion; and adopting two or more different display modes corresponding to different matching degrees of the edge satisfying the focusing condition.

The focusing information may be output in a specific visually recognizable form at a position of the edge satisfying the focusing condition. For example, a predetermined sign or symbol may be displayed at the position of the extracted edge satisfying the focusing condition. The position of the extracted edge may be expressed by the contour of an object judged as focused by the focusing information visualization device. The user can utilize the contour of the object as useful information for finally judging the focusing status of the photographic image.

The focusing information may be output in a specific visually recognizable form corresponding to a width of the edge at the position of the edge satisfying the focusing condition. This arrangement informs the user of the degree of focusing as well as the position of focusing as the focusing status of a photographic image, thus enhancing the efficiency of checking the focusing status of the photographic image.

In the focusing information visualization device of the invention, the focusing information output module may output the focusing information to be overlapped with the photographic image. This arrangement enables the user to readily check the position of focus judgment in the photographic image.

In still another preferable embodiment of the focusing information visualization device of the invention, the focusing information output module displays at least one area including the edge satisfying the focusing condition as a divisional area parted by a frame image on the screen, and, in response to a user's operational specification of one divisional area, outputs an enlarged photographic image corresponding to the specified divisional area at a desired magnification ratio on the screen. This arrangement enables the user to refer to the result of focus judgment by the focusing information visualization device and efficiently recognize the focusing status of the photographic image based on the user's visual sense.

According to one application of the invention, the focusing information visualization device further has a printing medium specification module that specifies a size of a printing medium used for printing the photographic image. The edge extraction module specifies an edge condition for extraction of the edge satisfying the focusing condition, based on the specified size of the printing medium and a size of the photographic image and extracts the edge based on the specified edge condition. The focusing status represents the visual impression of a printed image. The size of the printing medium (typically print paper) used for printing the photographic image affects the visual impression in a fixed focusing status. It is accordingly effective to change the edge condition for the edge extraction according to the size of the printing medium and the size of the photographic image and set the visual form of the focusing information based on the edge condition.

The embodiments and modified examples discussed above are to be considered in all aspects as illustrative and not restrictive. There may be many other modifications, changes, and alterations without departing from the scope or spirit of the main characteristics of the present invention. For example, the focusing information visualization device of the invention may be mounted on diversity of equipment, for example, a printer equipped with a liquid crystal display, a camera-equipped cell phone, or a photo viewer for enlarged display of a photographic image, as well as the digital still camera described in the embodiments. The focusing information visualization device may be mounted on a computer to enable the user's selection of desired photographic images on a monitor of the computer. Other possible applications of the invention include a focusing information visualization method, a focusing information visualization program, and a computer readable recording medium for recording the focusing information visualization program.

What is claimed is:

1. A focusing information visualization device that visually displays focusing information of a photographic image on a screen, the focusing information visualization device comprising:

an edge extraction module that extracts an edge within the photographic image; and a focusing information output module that outputs focusing information based on the extracted edge in a visually recognizable manner on the screen, wherein the focusing information output module displays a part of the photographic image corresponding to a position of the extracted edge in a differentiating display form of adopting two or more different display modes corresponding to different matching degrees of the edge as the focusing information.

2. The focusing information visualization device in accordance with claim 1, wherein the edge extraction module extracts the edge satisfying a preset focusing condition among edges present, based on luminance information of respective pixels constituting the photographic image.

3. The focusing information visualization device in accordance with claim 2, wherein the edge extraction module has:

an edge detector that detects an edge at each position of the photographic image according to the luminance information of the respective pixels constituting the photographic image;

a first edge extractor that extracts an edge having an intensity of not less than a preset first reference value among the detected edges;

an edge width calculator that computes an edge width of each extracted edge; and a second edge extractor that extracts any edge having the computed edge width of not greater than a preset second reference value.

4. The focusing information visualization device in accordance with claim 3, wherein the edge detector detects a gradual luminance difference variation area as an edge among the respective pixels constituting the photographic image, where the gradual luminance difference variation area has either a gradual increase or a gradual decrease in cumulative luminance difference between adjacent pixels aligned in a predetermined direction, the first edge extractor extracts an edge when an absolute value of the gradually increasing or decreasing cumulative luminance difference exceeds a predetermined threshold value, and the edge width calculator computes the width of the extracted edge over a whole range of the gradual increase or the gradual decrease.

5. The focusing information visualization device in accordance with claim 3, wherein the edge detector detects an edge at each position of the photographic image, based on a luminance difference between adjacent pixels aligned in a predetermined direction among the respective pixels constituting the photographic image.

6. The focusing information visualization device in accordance with claim 1, wherein the focusing information output module processes an original image at a position of the extracted edge on the screen to output the original image.

7. The focusing information visualization device in accordance with claim 6, wherein the focusing information outputs module outputs the original image at the position of the extracted edge in the differentiating display form of changing the original image to a gray image having a lightless of or over a predetermined level.

8. The focusing information visualization device in accordance with claim 7, wherein the focusing information outputs module outputs the original image at the position of the extracted edge in the differentiating display form of alternately displaying the original image and the gray image.

9. The focusing information visualization device in accordance with claim 6, wherein the focusing information output module outputs the original image at the position of the extracted edge in the differentiating display form of changing the original image to an image of negative-positive inversion.

10. The focusing information visualization device in accordance with claim 1, wherein the focusing information visualization device is equipped on a camera device.

11. The focusing information visualization device in accordance with claim 6, wherein the focusing information is output in a specific visually recognizable form at a position of the edge satisfying the focusing condition.

12. The focusing information visualization device in accordance with claim 6, wherein the focusing information output module outputs the focusing information in a specific visually recognizable form corresponding to a width of the edge at the position of the edge satisfying the focusing condition.

13. The focusing information visualization device in accordance with claim 1, wherein the focusing information output module outputs the focusing information to be overlapped with the photographic image.

14. The focusing information visualization device in accordance with claim 1, wherein the focusing information output module displays at least one area including the edge satisfying the focusing condition as a divisional area parted by a frame image on the screen, and, in response to a user's operational specification of one divisional area, outputs an enlarged photographic image corresponding to the specified divisional area at a desired magnification ratio on the screen.

15. The focusing information visualization device in accordance with claim 1, the focusing information visualization device further including:

a printing medium specification module that specifies a size of a printing medium used for printing the photographic image, wherein the edge extraction module specifies an edge condition for extraction of the edge satisfying the focusing condition, based on the specified size of the printing medium and a size of the photographic image and extracts the edge based on the specified edge condition.

16. A focusing information visualization method that visually displays focusing information of a photographic image on a screen, the focusing information visualization method comprising:

extracting an edge within the photographic image; and outputting focusing information based on the extracted edge, wherein the outputting of the focusing information includes displaying a part of the photographic image corresponding to a position of the extracted edge in a differentiating display form of adopting two or more different display modes corresponding to different matching degrees of the edge as the focusing information, and wherein each operation of the focusing information visualization method is executed by a processor.

17. A program product that causes a computer to visually display focusing information of a photographic image on a screen, the program product including a non-transitory computer readable recording medium having program code stored thereon, wherein the program code is executed by the computer to attain:

an edge extraction function of extracting an edge within the photographic image; and a focusing information output function of outputting focusing information based on the extracted edge, wherein the focusing information output function includes displaying a part of the photographic image corresponding to a position of the extracted edge in a differentiating display form of adopting two or more different display modes corresponding to different matching degrees of the edge as the focusing information.

* * * * *